Sept. 30, 1969  M. A. SIEVERS  3,470,349
GUIDE FOR WELDING WIRE
Filed March 15, 1965
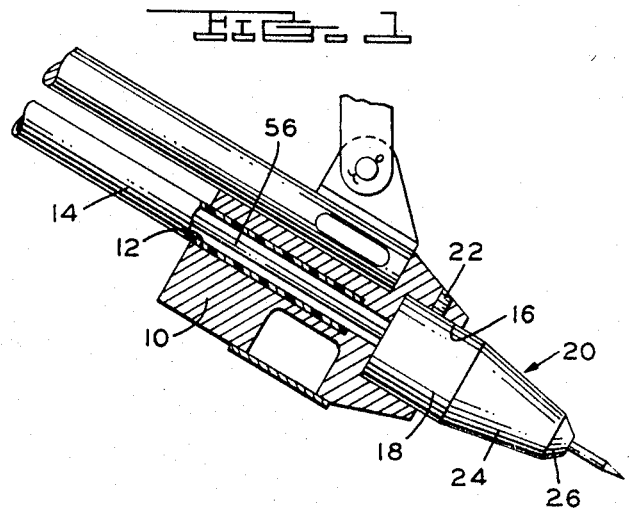
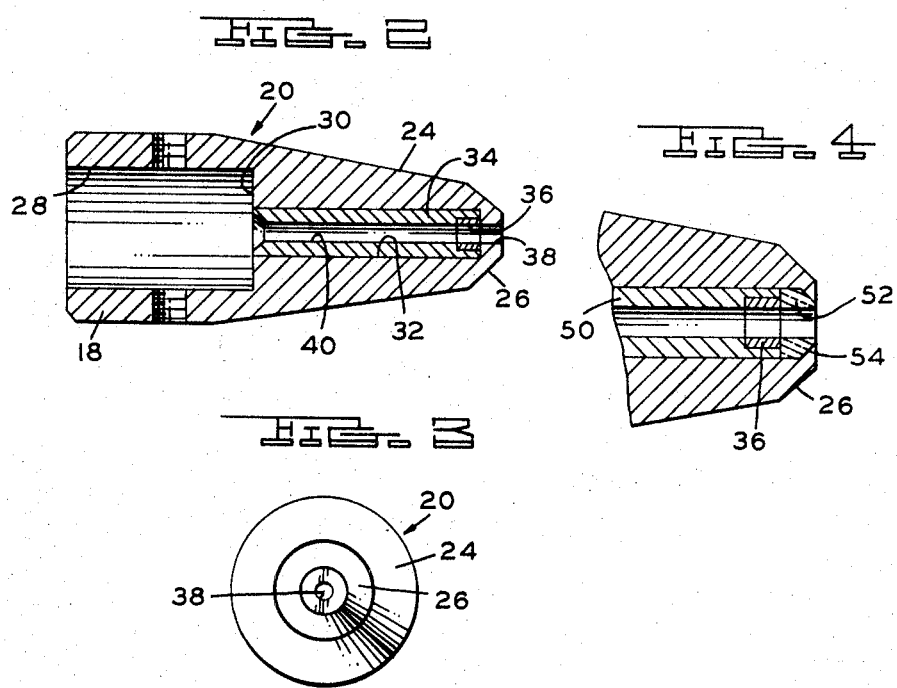
INVENTOR
MAX A. SIEVERS
BY
Barnes, Kisselle, Raisch & Choate
ATTORNEYS 3,470,349
GUIDE FOR WELDING WIRE
Max A. Sievers, 17144 Mount Elliott,
Detroit, Mich. 48212
Filed Mar. 15, 1965, Ser. No. 439,742
Int. Cl. B23k 9/00
U.S. Cl. 219—136            2 Claims

ABSTRACT OF THE DISCLOSURE

A metallic arc welding nozzle having a passage through which electrode wire is fed in a conductive relationship improved to avoid the sticking of weld spatter and to improve the wear characteristics by forming the basic nozzle body of pure copper and providing a wear resistant passage within the nozzle, a portion of it being formed of a material harder than copper but still conductive and a portion of it at the tip end having high wear resistance in the form of a carbide material and glass.

---

This invention relates to a wire feed nozzle of the type used in electric welding machines where a continuous welding wire is fed through a guiding nozzle. One of the difficulties in connection with this type of apparatus is that the spatter from the welding operation is apt to accumulate on the nozzle and also there is likely to be some arcing and a resultant pitting and general deterioration of the nozzle due to the conditions of heat under which it must operate and due to the wear of the wire as it feeds continuously through the nozzle.

It is an object of the present invention to provide a nozzle which has a much longer life than previous nozzles due to the particular combination of elements that are used in it.

The construction of the present invention has resulted in the extension of life of the nozzle from an average period of four hours per change to periods which last as long as four or five days.

It is a further object of the invention to provide a nozzle having high life characteristics without detracting from the conductive capacity which it must have in order to feed the welding wire properly to the work.

Another object is the use of materials to improve wear characteristics and shaped and assembled in a manner to maintain cost at a minimum and position the more expensive wear parts for protection against direct contact with spatter.

Other objects and features of the invention relating to details of construction and operation will be apparent in the following description and claims.

Drawings accompany the disclosure and the various views thereof may be briefly described as:

FIGURE 1, a view of the nozzle assembly in elevation showing a portion of the feed mechanism in section.

FIGURE 2, a sectional view of the nozzle per se.

FIGURE 3, an end view of the nozzle.

FIGURE 4, a sectional view of a modified form of the nozzle.

Referring to the drawings:

In FIGURE 1, a nozzle support is shown wherein a housing 10 has inserted through a bore 12 therein a feed tube 14. In the lower end of the housing 10 is an enlarged bore 16 concentric with bore 12 adapted to receive a cylindrical end 18 of a nozzle 20, the cylindrical portion being held in place by a set screw 22. The nozzle has an intermediate portion 24 which is tapered downwardly to a tip portion 26. The cylindrical portion 18 of the nozzle 20 has a bore 28 substantially the same size as the interior dimension of tube 14 and this bore 28 terminates at a shoulder 30. The remainder of the nozzle is provided with a smaller bore 32 in which is snugly fitted a tube 34 having on the interior surface thereof, and at the tip end, a recessed collar or ring 36 which is preferably formed of a sintered tungsten carbide material of the type used for wear parts and cutting tools and the like. The tip portion 26 also has a small hole 38 which is aligned with and preferably of about the same dimension as the passage 40 in tube 34 and insert 36.

In assembly the collar or ring 36 formed of hard wear-resistant material is inserted into the recess in the interior end of tube 34 and the tube is then pressed into the bore 32. This provides good back-up surfaces for the wear-resistant collar while allowing it to perform its function in a protected area.

The nozzle body 20 is preferably formed of a pure copper since it has been found that this is the best material to resist the sticking of weld spatter. The tube 34 on the other hand is formed of an alloy primarily of copper but of a harder material such as an aluminum bronze alloy. One example of this is a material which is sold commercially as Mallory No. 3.

In the modified form of FIGURE 4, the nozzle contains a contact wear tube 50 somewhat shorter than that shown in FIGURE 2 but carrying the wear insert 36 in the end. Forward of the tube 50 is a glass insert 52 having a tapered end 54, this insert being received in a complemental recess at the tip 26. Apart from this variation, the nozzle of FIGURE 4 is formed of the same materials as that shown in FIGURE 2. Assembly of the structure in FIGURE 4 is accomplished by feeding the glass insert 52 in place and then pushing in the tube 50 to secure the insert 52 in place and position the carbide ring directly behind it.

In each case, the wire shown at 56 in FIGURE 1 is fed from a suitable supply through the nozzle support block 10 and the tube 14 to the nozzle chamber 28 where it feeds into the tube 34 of FIGURE 2 or the tube 50 of FIGURE 4. At this point, the wire has a contact fit with the aluminum bronze sleeve 34 or 50 to maintain an electrical contact therewith.

The end of the nozzle is provided with the carbide tips so that the wear of the wire whipping back and forth, as it will at the end of the nozzle, will be against the interior surface at the end of the electrical contact tube. In both embodiments, the main wear is taken by the carbide insert 36 and in FIGURE 4 the glass insert 52 resists the accumulation of spatter which may attempt to enter the tube and somewhat protects the carbide from the intense heat which is developed at the weld. As indicated above, the life of the nozzles above described is exceptionally longer than nozzles of pure metal which have been standard in commercial practice.

I claim:

1. A metallic arc welding nozzle having a feed end and tip end through which electrode wire is fed longitudinally and adapted to be supported at the end of a wire feed tube comprising:
   (a) a body having an entrance end and a tip end formed of substantially pure copper and provided with a central bore,
   (b) a tubular liner positioned in said bore to serve as a wire guide and electrical contact member for said wire, said liner being formed of a conductive alloy harder than the copper body and extending to a point spaced from but adjacent the said tip end, and
   (c) a ring of wear-resistant material formed of a sintered carbide positioned at the tip end of said tubular liner within said body forming a continuation of the central bore to complete a passage within said tube toward said tip.

2. A metallic arc welding nozzle having a feed end and tip end through which electrode wire is fed longitudinally comprising:
(a) a body formed of substantially pure copper and having a central bore terminating at a shoulder adjacent the tip end,
(b) a tube positioned in said bore to serve as a wire guide and electrical contact member for said wire, said tube being formed of a conductive alloy harder than the copper body,
(c) a ring of wear-resistant material positioned at the tip end of said tube within said body forming a continuation of the passage within said tube toward said tip, and
(d) a glass insert in said bore positioned adjacent said shoulder having a central passage aligned with said bore, said ring being positioned between said glass insert and said tube and retained in position by the frictional engagement of said tube in said body.

References Cited

UNITED STATES PATENTS

| | | | |
|---|---|---|---|
| 2,379,470 | 7/1945 | Baird | 219—136 |
| 2,478,525 | 8/1949 | Cutrer | 219—130 |
| 2,735,920 | 2/1956 | Valliere | 219—130 |
| 3,007,032 | 10/1961 | Whiteman | 219—130 |
| 3,194,943 | 7/1965 | Flora | 219—130 |

JOSEPH V. TRUHE, Primary Examiner

J. G. SMITH, Assistant Examiner